(12) United States Patent
Sakurai et al.

(10) Patent No.: US 7,994,490 B2
(45) Date of Patent: Aug. 9, 2011

(54) RADIATION IMAGE CONVERTING PANEL

(75) Inventors: Jun Sakurai, Hamamatsu (JP);
Ichinobu Shimizu, Hamamatsu (JP);
Gouji Kamimura, Hamamatsu (JP)

(73) Assignee: Hamamatsu Photonics K. K.,
Hamamatsu-shi, Shizuoka (JP)

( * ) Notice: Subject to any disclaimer, the term of this patent is extended or adjusted under 35 U.S.C. 154(b) by 154 days.

(21) Appl. No.: 12/350,500

(22) Filed: Jan. 8, 2009

(65) Prior Publication Data

US 2009/0261254 A1 Oct. 22, 2009

(30) Foreign Application Priority Data

Apr. 21, 2008 (JP) ................ P2008-110369

(51) Int. Cl.
*G01T 1/16* (2006.01)
(52) U.S. Cl. ..................................... 250/581
(58) Field of Classification Search .......... 250/590, 250/591
See application file for complete search history.

(56) References Cited

U.S. PATENT DOCUMENTS

| | | | |
|---|---|---|---|
| 6,169,360 B1 * | 1/2001 | Tanno et al. | 313/530 |
| 6,262,422 B1 * | 7/2001 | Homme et al. | 250/370.11 |
| 6,933,502 B2 | 8/2005 | Okada et al. | |
| 6,963,070 B2 | 11/2005 | Okada et al. | |
| 6,974,955 B2 | 12/2005 | Okada et al. | |
| 2006/0033032 A1 * | 2/2006 | Inoue et al. | 250/370.11 |
| 2006/0065861 A1 * | 3/2006 | Tazaki | 250/580 |
| 2007/0051896 A1 * | 3/2007 | Okada et al. | 250/370.11 |

FOREIGN PATENT DOCUMENTS

| | | |
|---|---|---|
| JP | 2-58000 | 2/1990 |
| JP | 2003-066147 A | 3/2003 |
| JP | 2005091143 A | 4/2005 |
| JP | 2005-315786 | 11/2005 |

\* cited by examiner

*Primary Examiner* — David P Porta
*Assistant Examiner* — David S Baker
(74) *Attorney, Agent, or Firm* — Drinker Biddle & Reath LLP

(57) ABSTRACT

The present invention relates to a radiation image converting panel with a structure capable of arbitrarily controlling the luminance distribution of the panel surface after formation of a protective film according to usage conditions. The radiation image converting panel comprises a support body and a radiation converting film formed on the support body. The radiation converting film is formed on a film forming region which exists within a first main surface of the support body and includes at least a gravity center position of the first main surface. The film thickness of the radiation converting film is adjusted such that the maximum difference can be obtained in either one of a peripheral area and a middle area from a central area including the gravity center position.

10 Claims, 10 Drawing Sheets

DISTANCE FROM GRAVITY CENTER POSITION G

DISTANCE FROM GRAVITY CENTER POSITION G

| FILM THICKNESS (μm) | FILM THICKNES (RELATIVE VALUE) | LUMINANCE (RELATIVE VALUE) |
|---|---|---|
|  | 0.84 | 0.85 |
| 457 | 0.86 | 0.84 |
| 461 | 0.87 | 0.85 |
| 463 | 0.88 | 0.90 |
| 465 | 0.88 | 0.86 |
| 479 | 0.91 | 0.87 |
| 480 | 0.91 | 0.88 |
| 482 | 0.91 | 0.87 |
| 484 | 0.91 | 0.94 |
| 487 | 0.92 | 0.93 |
| 490 | 0.93 | 0.94 |
| 495 | 0.94 | 0.93 |
| 498 | 0.94 | 0.93 |
| 500 | 0.95 | 0.94 |
| 503 | 0.95 | 0.92 |
| 505 | 0.95 | 0.94 |
| 511 | 0.97 | 0.93 |
| 518 | 0.98 | 0.94 |
| 521 | 0.98 | 0.99 |
| 529 | 1.00 | 1.00 |

RADIATION IMAGE CONVERTING PANEL

BACKGROUND OF THE INVENTION

1. Field of the Invention

The present invention relates to a radiation image converting panel comprising a radiation converting film having a columnar crystal structure, which converts an incident radiation ray to a visible light.

2. Related Background Art

Radiation images typified by X-ray images have conventionally been widely used for a purposes such as disease diagnosis. As a technique for obtaining such a radiation image, for example, a radiation image recording and reproducing technique using a radiation converting film that accumulates and records irradiated radiation energy, and also emits a visible light according to radiation energy accumulated and recorded as a result of irradiating an excitation light has been widely put into practical use.

A radiation image converting panel to be applied to such a radiation image recording and reproducing technique as this includes a support body and a radiation converting film provided on the support body. As the radiation converting film, a photostimulable phosphor layer having a columnar crystal structure formed by vapor-phase growth (deposition) has been known. When the photostimulable phosphor layer has a columnar crystal structure, since a photostimulable excitation light or photostimulable emission is effectively suppressed from diffusing in the horizontal direction (reaches the support body surface while repeating reflection at crack (columnar crystal) interfaces), this allows remarkably increasing the sharpness of an image by photostimulable emission.

For example, Japanese Patent Application Laid-Open No. H02-58000 has proposed a radiation image converting panel having a photostimulable phosphor layer for which formed by a vapor-phase deposition method on a support body are slender columnar crystals with a constant tilt with respect to a normal direction of the support body. Furthermore, Japanese Patent Application Laid-Open No. 2005-315786 has proposed a technique for preventing, by sealing a photostimulable phosphor layer formed on a support body with a moisture-proof protective film made of a base material having a surface roughness Ra of 20 nm or less and a multilayered moisture-proof layer, deterioration of the photostimulable phosphor layer due to moisture and the like.

SUMMARY OF THE INVENTION

The present inventors have examined the conventional radiation image converting panels in detail, and as a result, have discovered the following problems. That is, in the conventional radiation image converting panels, luminance distribution in the panel surface has changed between before and after formation of a protective film on the surface of the radiation converting film. As an example of the change in luminance distribution, specifically, the luminance in the vicinity of the center of the panel slightly decreases, while the luminance in the periphery of the panel increases. Therefore, conventional radiation image converting panels have had luminance distribution characteristics that the luminance in the periphery of the panel is higher than that in the vicinity of the center. In an actual service condition, the vicinity of the center of the panel is considered to be most frequently used, and there has been a problem that a luminance unevenness on the panel surface becomes significant as time passes.

The present invention has been developed to eliminate the problems described above. It is an object of the present invention to provide a radiation image converting panel with a structure capable of, in consideration of a change in luminance distribution of the panel surface between before and after formation of a protective film to be provided on the surface of a radiation converting film, arbitrarily controlling the luminance distribution of the panel surface after formation of a protective film according to usage conditions.

A radiation image converting panel according to the present invention has been completed by the inventors' discovery that control of the film thickness of a radiation converting film makes it possible to adjust the luminance of the panel surface after formation of a protective film. In oncrete terms, a radiation image converting panel according to the present invention comprises a support body, and a radiation converting film formed on the support body. The support body includes a parallel plate having a first main surface on which the radiation converting film is formed and a second main surface opposing the first main surface. The radiation converting film is provided on a film forming region. The film forming region exists within the first main surface of the support body and includes at least a gravity center position of the first main surface. The radiation converting film is an Eu-doped photostimulable phosphor layer, and is comprised of columnar crystals which are coincident or tilted at a predetermined angle with respect to a normal direction of the first main surface.

Particularly, in the radiation image converting panel according to the present invention, the radiation converting film has a sectional shape of any one of a convex sectional shape, a sectional W-shape, a concave sectional shape, and a sectional M-shape, in order to arbitrarily control the luminance distribution of the panel surface after formation of a protective film.

In the case that the radiation converting film has a convex sectional shape, in the film forming region of the first main surface, a part of the radiation converting film having a maximum film thickness locates on a central area around the gravity center position whose radius equals 5% or less of a minimum distance from the gravity center position to an edge of the film forming region, while a part of the radiation converting film having a minimum film thickness locates on a peripheral area sandwiched by a circumference of a circle whose radius equals 80% of the minimum distance and the edge of the film forming region. Also, when a radiation converting film having such a convex sectional shape is adopted, an effect that a luminance distribution of the panel surface after formation of a protective film becomes flat is obtained.

In the case that the radiation converting film has such a sectional convex shape, the film thickness of the radiation converting film monotonically decreases from a maximum film thickness point, which is located on the central area and corresponds to a position where the film thickness of the radiation converting film is maximized, toward a minimum film thickness point, which is located on the peripheral area and corresponds to a position where the film thickness of the radiation converting film is minimized. Moreover, when assuming the maximum film thickness point in the central area, corresponding to a position where the film thickness of the radiation converting film is maximized, as an origin, a distance (>0) from the maximum film thickness point as a horizontal axis, and a film thickness (>0) of the radiation converting film at a position corresponding to the distance from the maximum film thickness point as a longitudinal axis, a linear line connecting the point that indicates the maximum film thickness and the point that provides the minimum film thickness has a gradient of more than −0.002 and less than 0.

In the case that the radiation converting film has a sectional W-shape, in the film forming region of the first main surface, a part of the radiation converting film having a maximum film thickness locates on a central area around the gravity center position whose radius equals 5% or less of a minimum distance from the gravity center position to an edge of the film forming region, while a part of the radiation converting film having a minimum film thickness locates on a middle area sandwiched by a circumference of a circle whose radius equals 80% of the minimum distance and a contour of the central area. Also, in such a sectional W-shape, the film thickness of the radiation converting film located on a peripheral area, sandwiched by the circumference of the circle defining the middle area and the edge of the film forming region, monotonically increases from the circumference of the circle defining the middle area toward the edge of the film forming region. When a radiation converting film having such a sectional W-shape is adopted, there is an effect, on the panel surface after formation of a protective film, that the luminance in the vicinity of the center of the panel can further be increased while entirely maintaining a luminance equal to or more than an average luminance of the conventional radiation converting film having a flat sectional shape.

Furthermore, in the case that the radiation converting film has a concave sectional shape, in the film forming region of the first main surface, a part of the radiation converting film having a minimum film thickness locates on a central area around the gravity center position whose radius equals 5% or less of a minimum distance from the gravity center position to an edge of the film forming region, while a part of the radiation converting film having a maximum film thickness locates on a peripheral area sandwiched by a circumference of a circle whose radius equals 80% of the minimum distance and the edge of the film forming region. Also, the radiation converting film having such a concave sectional shape is effective when an attention imaging region exists in the periphery of the panel.

When the radiation converting film has such a concave sectional shape, the film thickness of the radiation converting film monotonically increases from a minimum film thickness point, which is located on the central area and corresponds to a position where the film thickness of the radiation converting film is minimized, toward a maximum film thickness point, which is located on the peripheral area and corresponds to a position where the film thickness of the radiation converting film is maximized. Moreover, when assuming the minimum film thickness point in the central area, corresponding to a position where the film thickness of the radiation converting film is minimized, as an origin, a distance (>0) from the minimum film thickness point as a horizontal axis, and a film thickness (>0) of the radiation converting film at a position corresponding to the distance from the minimum film thickness point as a longitudinal axis, a linear line connecting the point that indicates the minimum film thickness and the point that provides the maximum film thickness has a gradient of more than 0 and less than 0.002.

In the case that the radiation converting film has a sectional M-shape, in the film forming region of the first main surface, a part of the radiation converting film having a minimum film thickness locates on a central area around the gravity center position whose radius equals 5% or less of a minimum distance from the gravity center position to an edge of the film forming region, while a part of the radiation converting film having a maximum film thickness locates on a middle area sandwiched by a circumference of a circle whose radius equals 80% of the minimum distance and a contour of the central area. Also, in such a sectional M-shape, the film thickness of the radiation converting film located on a peripheral area, which is sandwiched by the circumference of the circle defining the middle area and the edge of the film forming region, monotonically decreases from the circumference of the circle defining the middle area toward the edge of the film forming region. When a radiation converting film having such a sectional M-shape is adopted, an effect to make the effect of the sectional concave shape described above further prominent is obtained on the panel surface after formation of a protective film.

Furthermore, the radiation image converting panel according to the present invention may include a moisture-resistant protective film (transparent organic film) that covers an exposed surface of the radiation converting film excluding a surface covered by the first main surface of the support body.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1A:
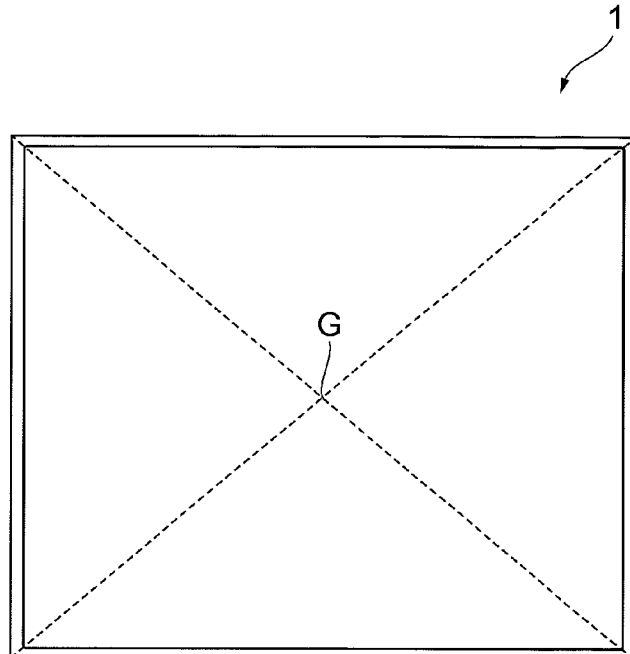
FIGS. 1A to 1C are views showing a structure of an embodiment of a radiation image converting panel according to the present invention.

In the following, embodiments of a radiation image converting panel according to the present invention will be explained in detail with reference to FIGS. 1A to 4E, 5, and 6A to 10B. In the description of the drawings, identical or corresponding components are designated by the same reference numerals, and overlapping description is omitted.

Figure 1B:
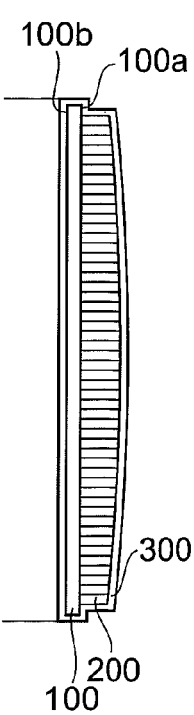
Figure 1C:
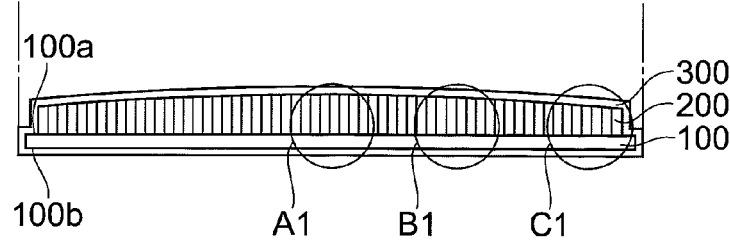

FIGS. 1A to 1C are views showing a structure of an embodiment of a radiation image converting panel according to the present invention. In particular, FIG. 1A is a plan view of the radiation image converting panel 1, FIG. 1B is a sectional view of the radiation image converting panel 1 along the line I-I in FIG. 1A, and FIG. 1C is a sectional view of the radiation image converting panel 1 along the line II-II in FIG. 1A.

In FIGS. 1A to 1C, the radiation image converting panel 1 comprises a support body 100, a radiation converting film 200 formed on the support body 100, and a protective film 300 (transparent organic film) that wholly covers the support body 100 and the radiation converting film 200. The support body 100 is a parallel plate having a first main surface 100a on which the radiation converting film 200 is formed and a second main surface 100b opposing the first main surface 100a. Moreover, when the support body 100 is made of a corrodible metal material such as Al, an anti-corrosion film such as an anodic oxidation film is preferably formed on the surface thereof. The radiation converting film 200 is formed on a film forming region R. The film forming region R exists within the first main surface 100a of the support body 100 and includes at least a gravity center position G of the first main surface 100a. This radiation converting film 200 is comprised of columnar crystals which are coincident or tilted at a predetermined angle with respect to a normal direction of the first main surface 100a.

Figure 2A:
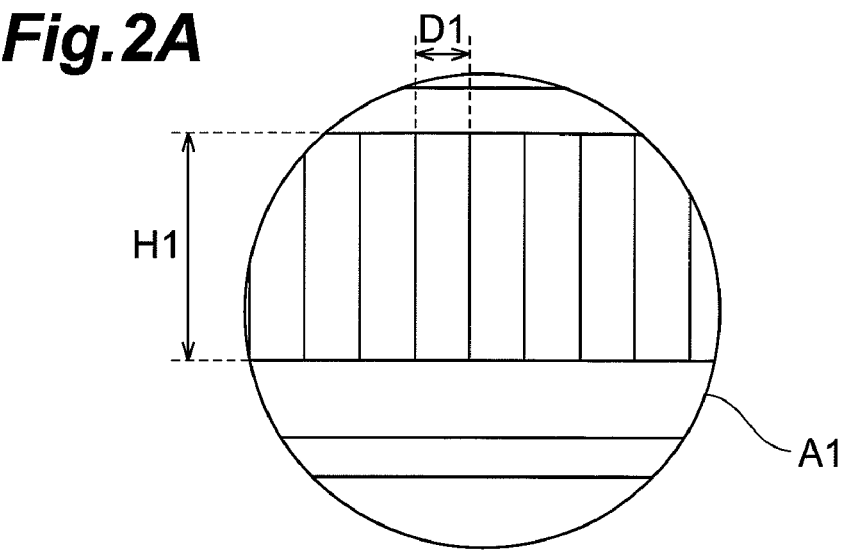
FIGS. 2A to 2C are views showing sectional structures of respective parts in a radiation converting film of a radiation image converting panel according to the present invention.
Figure 2B:
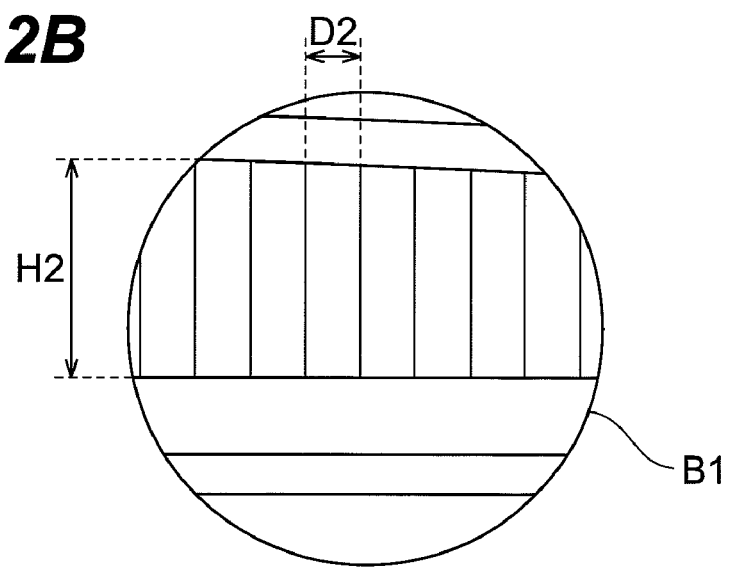
Figure 2C:
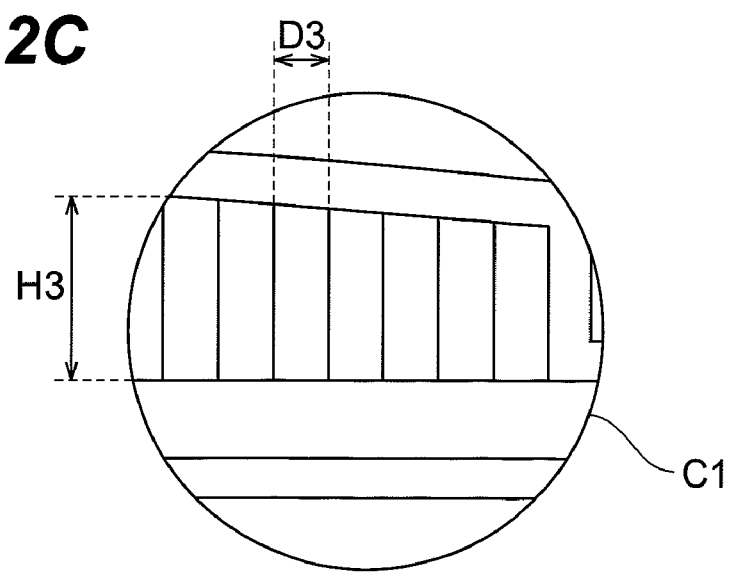

FIGS. 2A to 2C are views showing sectional structures of respective parts in a radiation converting film according to the present invention. In concrete terms, FIG. 2A is a sectional view of a region A1 in FIG. 1C, FIG. 2B is a sectional view of a region B1 in FIG. 1C, and FIG. 2C is a sectional view of a region C1 in FIG. 1C.

As can be understood from FIGS. 2A to 2C, the crystal diameters D1 to D3 of columnar crystals that form the radiation converting film 200 are all approximately 7 μm, which are almost uniform across the entire surface of the radiation converting film 200. However, the radiation converting film 200 has been doped with Eu being an activator, and for the film thickness of the radiation converting film 200, in consideration of a change in luminance distribution between before and after formation of a protective film 300, the sectional shape is adjusted so as to meet a specific purpose.

Figure 3A:
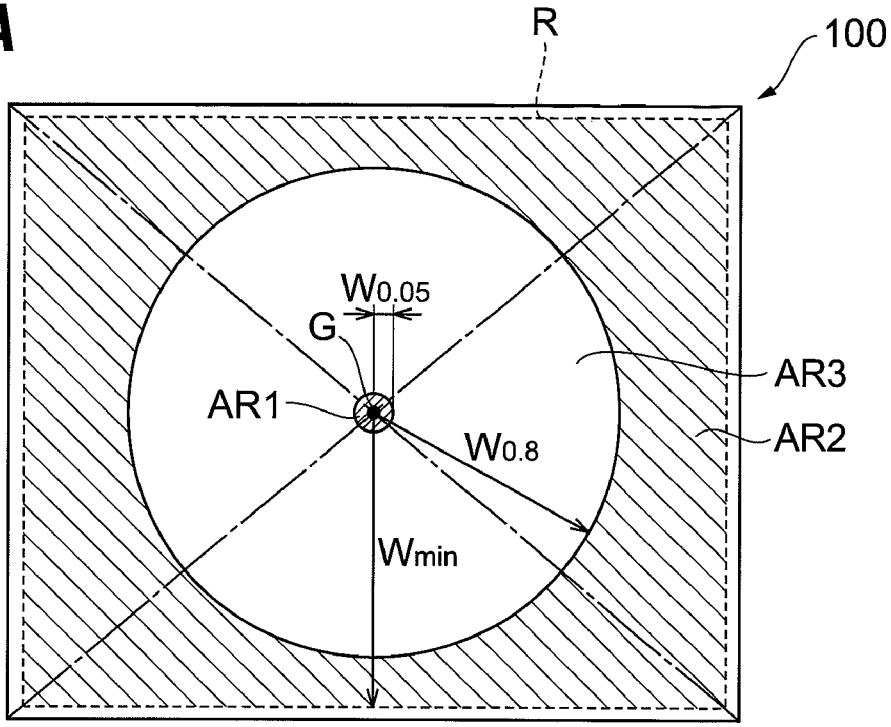
FIGS. 3A to 3C are views for concretely explaining a method for specifying a central area and a peripheral area on the first main surface of a support body.

Next, by use of FIGS. 3A to 3C, description will be given, in terms of a film forming region R in the first main surface 100a of the support body 100, of a central area AR1, a peripheral area AR2, and a middle area AR3 of the film forming region R for defining a film thickness distribution of the radiation converting film 200 to be formed on the film forming region R. FIG. 3A is a view for concretely explaining a method for specifying a central area AR1 and a peripheral area AR2 in the first main surface 100a (film forming region R) of the support body 100.

As shown in FIG. 3A, the central area AR1 in the film forming region R is a local region including the gravity center position G. In concrete terms, this is a local region including the gravity center position G whose radius equals 5% of a minimum distance $W_{min}$ from the gravity center position G to an edge of the film forming region R. Accordingly, a distance from the gravity center position G to a contour of the central area AR1 is given by $W_{0.05}$. On the other hand, the peripheral area AR2 in the film forming region R is a local region sandwiched by the edge of the film forming region R and the circumference of a circle whose radius equals 40% to 80% of the minimum distance $W_{min}$ from the gravity center position G to an edge of the film forming region R. The radius is given at this time by a distance $W_{0.8}$ (when the distance is 80% of the minimum distance $W_{min}$) from the gravity center position G to the circumference. Moreover, the middle area AR3 is a region sandwiched by the contour of the central area AR1 and the circumference of the circle to define the peripheral area AR2.

Also, the radiation converting film 200 is formed on the film forming region R of the first main surface 100a where the central area AR1, the peripheral area AR2, and the middle area AR3 are thus defined, and the vicinity of the center and periphery of the radiation converting film 200 may be considered as regions substantially coincident with the central area AR1 and the peripheral area AR2 defined in FIG. 3A, respectively.

The radiation converting film 200 has a sectional shape (for example, a section along the line II-II in FIG. 1A) of any one of a convex sectional shape, a sectional W-shape, a concave sectional shape, and a sectional M-shape, in order to arbitrarily control the luminance distribution of the panel surface after formation of the protective film 300.

Figure 3B:
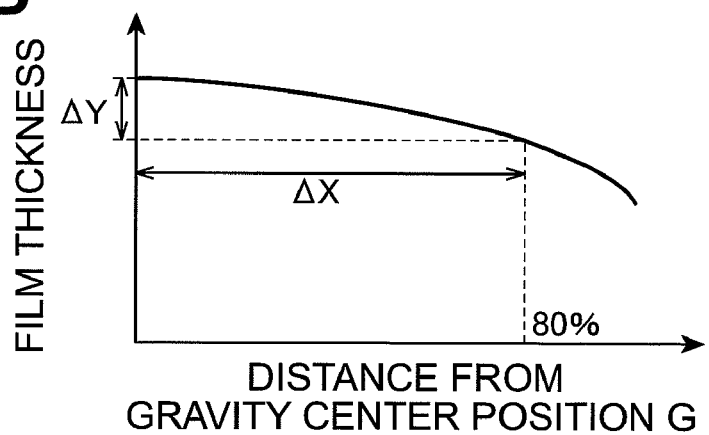

Particularly, in the case that the radiation converting film 200 has a convex sectional shape, as shown in, for example, FIG. 3B, the film thickness monotonically decreases from a maximum film thickness point, which is located on the central area AR1 and corresponds to a position where the film thickness of the radiation converting film 200 is maximized (for example, the gravity center position G), toward a minimum film thickness point, which is located on the peripheral area AR2 and corresponds to a position where the film thickness of the radiation converting film 200 is minimized (for example, a position where a distance from the gravity center position G is $W_{0.8}$). Also, FIG. 3B is a graph showing a relationship between the distance and a change in film thickness, wherein the maximum film thickness point, which is located on the central area AR1 and corresponds to the gravity center position G where the film thickness of the radiation converting film 200 is maximized, is assumed as the origin, a distance (>0) from the maximum film thickness point is assumed as the horizontal axis, and a film thickness (>0) of the radiation converting film 200 at a position corresponding to the distance from the maximum film thickness point is assumed as the longitudinal axis.

The support body 100 assumes a minimum size of 100 mm×100 mm and a maximum size of 1000 mm×1000 mm. At this time, the radiation converting film 200 has a film thickness of 100 μm to 1100 μm. When reading a radiation image accumulated in a photostimulable phosphor layer serving as the radiation converting film 200 by a scanner, for avoiding a deterioration in the S/N ratio whenever possible, an allowable range of variation in film thickness of the radiation converting film 200 is ±100 μm, preferably, ±80 μm (when a variation in film thickness of the entire surface of the film forming region R is provided as ±100 μm at a maximum, ±80 μm at a position of the distance $W_{0.8}$).

In concrete terms, when the support body 100 has a size of 100 mm×100 mm (the film forming region R has a slightly smaller size), the film thickness at the position separated from the gravity center position G by the distance $W_{0.8}$ (the minimum distance $W_{min}$ is 50 mm, and a distance that equals 80% thereof is 40 mm) is reduced by 80 μm at a maximum from the film thickness of the radiation converting film 200 at the gravity center position G. At this time, a gradient "a" of the graph shown in FIG. 3B is −0.0002 (=−0.008 mm/40 mm). Accordingly, when the radiation converting film 200 has a convex sectional shape, the gradient "a" of the graph showing a change in film thickness (monotonic decrease) satisfies −0.002<a<0.

Figure 3C:
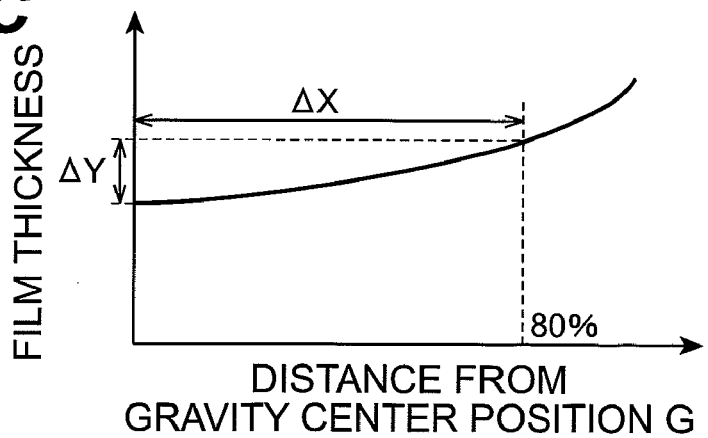

On the other hand, in the case that the radiation converting film 200 has a concave sectional shape, as shown in, for example, FIG. 3C, the film thickness monotonically increases from a minimum film thickness point, which is located on the central area AR1 and corresponds to a position where the film thickness of the radiation converting film 200 is minimized (for example, the gravity center position G), toward a maximum film thickness point, which is located on the peripheral area AR2 and corresponds to a position where the film thickness of the radiation converting film 200 is maximized (for example, a position where a distance from the gravity center position G is $W_{0.8}$). Also, FIG. 3C is a graph showing a relationship between the distance and a change in film thickness, wherein the minimum film thickness point, which is located on the central area AR1 and corresponds to the gravity center position G where the film thickness of the radiation converting film 200 is minimized, is assumed as the origin, a distance (>0) from the minimum film thickness point is assumed as the horizontal axis, and a film thickness (>0) of the radiation converting film 200 at a position corresponding to the distance from the minimum film thickness point is assumed as the longitudinal axis.

For calculating a gradient "b" of the graph shown in FIG. 3C under the same conditions as those in the case of FIG. 3B, when the support body 100 has a size of 100 mm×100 mm (the film forming region R has a slightly smaller size), the film thickness at the position separated from the gravity center position G by the distance $W_{0.8}$ (the minimum distance $W_{min}$ is 50 mm, and a distance that equals 80% thereof is 40 mm) is increased by 80 μm at a maximum from the film thickness of the radiation converting film 200 at the gravity center position G. At this time, a gradient "b" of the graph shown in FIG. 3C is 0.0002 (=0.008 mm/40 mm). Accordingly, when the radiation converting film 200 has a concave sectional shape, the gradient "b" of the graph showing a change in film thickness (monotonic increase) satisfies 0<b<0.002.

Figure 4A:
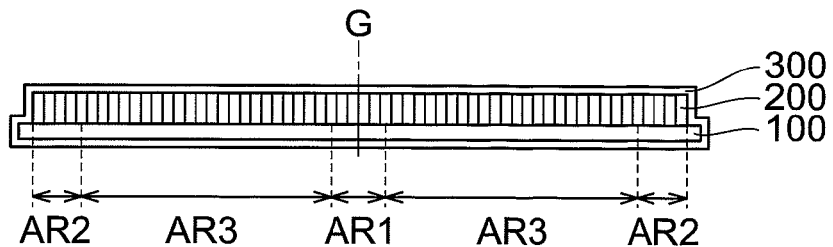
FIGS. 4A and 4E are views for explaining various embodiments of a radiation converting film in a radiation image converting panel according to the present invention.
Figure 4B:
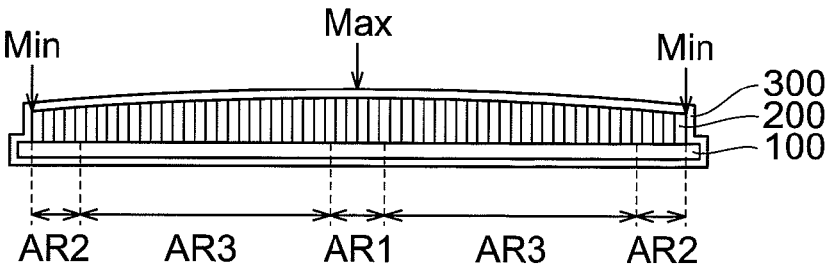

Next, description will be given of a concrete sectional structure of the radiation converting film 200 to be applied to the radiation image converting panel 1 according to the present invention. FIGS. 4A and 4B are views for explaining various embodiments of the radiation converting film in a radiation image converting panel 1 according to the present invention. The sections shown in FIGS. 4A to 4E are sectional views along the line II-II in FIG. 1A. Also, FIG. 4A is a sectional view of a radiation image converting panel having a radiation converting film formed so that the film thickness becomes uniform, prepared for a comparison.

The radiation image converting panel according to a comparative example shown in FIG. 4A includes a radiation converting film having a flat sectional shape without a change in film thickness between the vicinity of the center and periphery. Such a radiation image converting panel showed a sharp drop in luminance in the vicinity of the center of the panel after formation of a protective film, and a luminance unevenness occurred in the panel as a whole (see FIGS. 9A and 9B to be described later).

FIG. 4B is a sectional view of the radiation image converting panel 1 according to the present invention, which includes a radiation converting film 200 having a convex sectional shape. In the case that a radiation converting film 200 having such a convex sectional shape is adopted, an effect that a luminance distribution of the panel surface after formation of a protective film becomes flat is obtained.

In the radiation converting film 200 having a convex sectional shape, a part of the radiation converting film 200 having the maximum film thickness locates on the central area AR1, while a part of the radiation converting film 200 having the minimum film thickness locates on the peripheral area AR2. A change in film thickness at this time is represented by a monotonic decreasing function with a gradient "a" that satisfies −0.002<a<0, as shown in FIG. 3B.

Figure 4C:
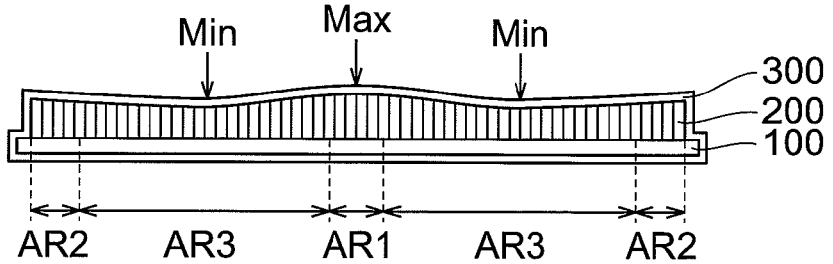

FIG. 4C is a sectional view of the radiation image converting panel 1 according to the present invention, which includes a radiation converting film 200 having a sectional W-shape. In the case that a radiation converting film 200 having such a sectional W-shape is adopted, there is an effect, on the panel surface after formation of a protective film, that the luminance in the vicinity of the center of the panel can further be increased while wholly maintaining a luminance equal to or more than an average luminance of the radiation converting film 200 having a flat sectional shape in FIG. 4A.

In the radiation converting film 200 having a sectional W-shape, a part of the radiation converting film 200 having the maximum film thickness exists on the central area AR1, while a part of the radiation converting film 200 having the minimum film thickness locates on the middle area AR3. Moreover, the film thickness of the radiation converting film 200 located on the peripheral area AR2 monotonically increases from the middle area AR3 toward the edge of the film forming region R.

Figure 4D:
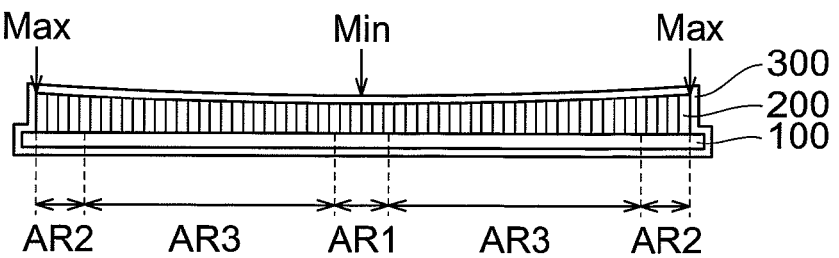

FIG. 4D is a sectional view of the radiation image converting panel 1 according to the present invention, which includes a radiation converting film 200 having a concave sectional shape. In the case that a radiation converting film 200 having such a concave sectional shape is adopted, an effect that the luminance in the periphery of the panel is increased is obtained on the panel surface after formation of a protective film. The radiation converting film 200 having such a concave sectional shape is effective when an attention imaging region exists in the periphery of the panel.

In the radiation converting film 200 having a sectional concave shape, a part of the radiation converting film 200 having the minimum film thickness exists on the central area AR1, while a part of the radiation converting film 200 having the maximum film thickness locates on the peripheral area AR2. A change in film thickness at this time is represented by a monotonic increasing function with a gradient "b" that satisfies 0<b<0.002, as shown in FIG. 3C.

Figure 4E:
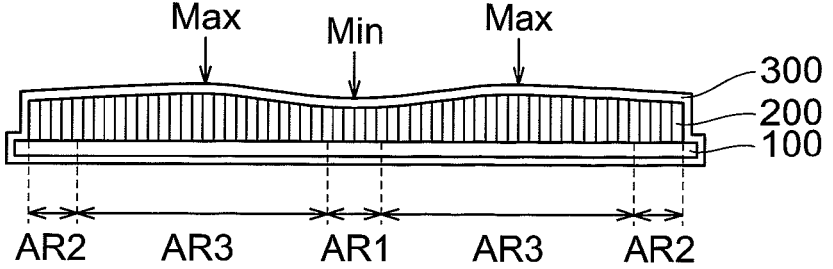

FIG. 4E is a sectional view of the radiation image converting panel 1 according to the present invention, which includes a radiation converting film 200 having a sectional M-shape. In the case that a radiation converting film 200 having such a sectional M-shape is adopted, an effect to make the effect of the sectional concave shape shown in FIG. 4D further prominent is obtained on the panel surface after formation of a protective film.

In the radiation converting film 200 having a sectional M-shape, a part of the radiation converting film 200 having the minimum film thickness exists on the central area AR1, while a part of the radiation converting film 200 having the maximum film thickness locates on the middle area AR3. Moreover, the film thickness of the radiation converting film 200 on the peripheral area AR2 monotonically decreases from the middle area AR3 toward the edge of the film forming region R.

The radiation image converting panel 1 according to the present invention, specifically, the radiation converting film 200 provided on the support body 100 is formed by a manufacturing apparatus shown in any one of FIGS. 5 and 6A to 7B. More specifically, by controlling the position to install a phosphor evaporation source and the inflow direction of a metal vapor in each of the manufacturing apparatuses shown in FIGS. 5 and 6A to 7B, the radiation converting films 200 having various sectional structures as shown in FIGS. 4B to 4E are obtained.

Figure 5:
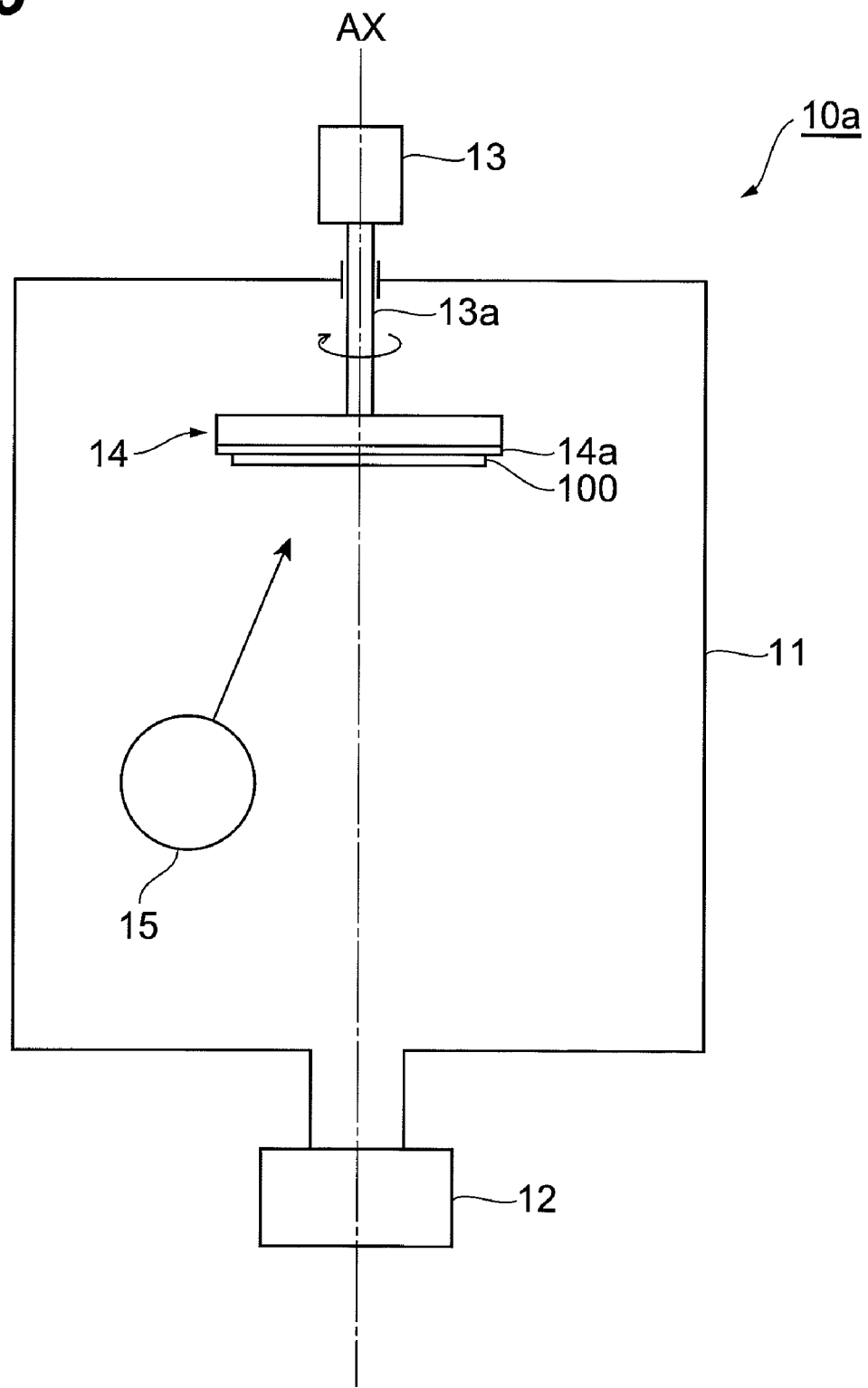
FIG. 5 is a view showing a configuration of a manufacturing apparatus for forming, on a support body, a radiation converting film with a flat surface, as a part of the manufacturing process of a radiation image converting panel according to the present invention.

First, FIG. 5 is a view showing a configuration of a manufacturing apparatus 10a for forming, on the support body 100, a radiation converting film 200 with a flat surface (a flat sectional shape), as a part of the manufacturing process of the radiation image converting panel 1 according to the present invention.

The manufacturing apparatus 10a shown in FIG. 5 is an apparatus that forms a radiation converting film 200 on the first main surface 100a of the support body 100 by a vapor-phase deposition method. As the vapor-phase deposition method, a vapor deposition method, a sputtering method, a CVD method, an ion plating method, or the like is applicable, and description will be given for, as an example, a case where the radiation converting film 200 of Eu-doped CsBr is formed on the support body 100 by a vapor deposition method. This manufacturing apparatus 10a includes, at least, a vacuum container 11, a support body holder 14, a rotary shaft 13a, a drive unit 13, a phosphor evaporation source 15, and a vacuum pump 12. The support body holder 14, the evaporation source 15, and a part of the rotary shaft 13a are arranged in the vacuum container 11. The support body holder 14 includes a heater 14a to heat the support body 100. One end of the rotary shaft 13a extended from the drive unit 13 is attached to the support body holder 14, and the drive unit 13 rotates the support body holder 14 via the rotary shaft 13a. The phosphor evaporation source 15, which is arranged at a position deviated from a center axis AX of the vacuum container 11, holds a metal material supplied as a metal vapor to be vapor-deposited on the support body 100 installed on the support body holder 14. The vacuum pump 12 depressurizes the interior of the vacuum container 11 to a predetermined degree of vacuum.

In the phosphor evaporation source 15, a mixture material of CsBr and EuBr is set. Moreover, the phosphor evaporation source 15 is set so that the inflow direction of a metal vapor points to the middle area AR3 of the support body 100 from the position off the axis AX. The support body 100 is set on the support body holder 14. The crystal diameter of columnar crystals to be formed on a surface, of the support body 100, facing the phosphor evaporation source 15 is adjusted by adjusting the temperature of the support body 100 itself with the heater 14a, and by controlling the degree of vacuum in the vacuum container 11, an inflow angle of the metal vapor from the material source 15 to the support body 100, and the like.

First, columnar crystals of Eu-doped CsBr are grown on the first main surface 100a (the surface facing the phosphor evaporation source 15) of the support body 100 by a vapor deposition method. At this time, the drive unit 13 is rotating the support body holder 14 via the rotary shaft 13a, and accordingly, the support body 100 is also rotating around the axis AX.

By such a vapor deposition method, a radiation converting film 200 with a film thickness of 500 μm±50 μm is formed on the support body 100. At this time, the crystal diameter of columnar crystals of the radiation converting film 200 is approximately 3 μm to 10 μm on average.

Figure 6A:
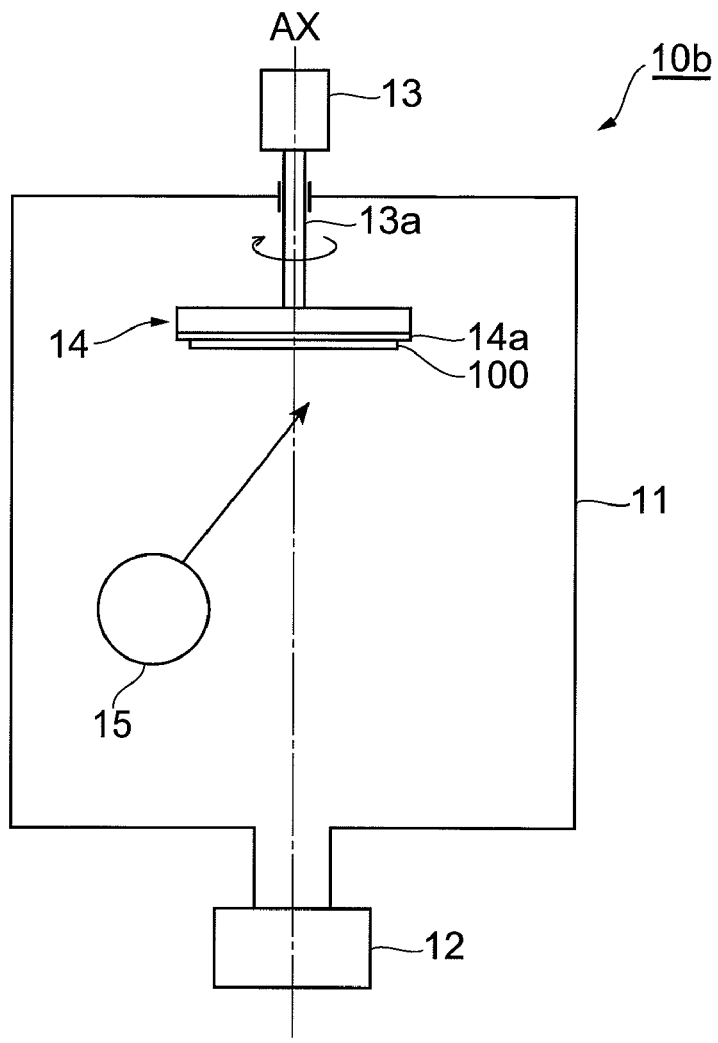
FIGS. 6A and 6B are views showing a configuration of a manufacturing apparatus for forming, on a support body, a radiation converting film with a film thickness reduced from the vicinity of the center toward the periphery, as a part of the manufacturing process of a radiation image converting panel according to the present invention.
Figure 6B:
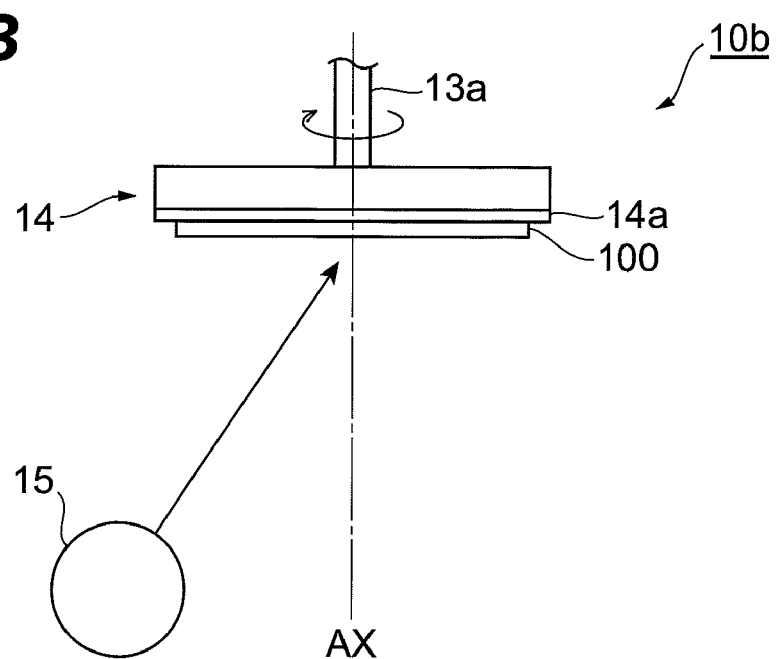

FIGS. 6A and 6B are views showing a configuration of a manufacturing apparatus 10b for forming, on the support body 100, a radiation converting film 200 with a film thickness reduced from the vicinity of the center toward the periphery (a convex sectional shape), as a part of the manufacturing process of the radiation image converting panel 1 according to the present invention. The manufacturing apparatus 10b shown in FIGS. 6A and 6B differs from the manufacturing apparatus 10a shown in FIG. 5 in terms of arrangement of the phosphor evaporation source 15 and inflow direction of a metal vapor.

More specifically, in the manufacturing apparatus 10b shown in FIG. 6A, the phosphor evaporation source 15 is installed at a position off the axis AX, and the inflow direction of a metal vapor from the phosphor evaporation source 15 is oriented to the middle area AR3 located at an opposite side across the axis AX in a manner crossing the axis AX. As a result of the phosphor evaporation source 15 being thus installed, a radiation converting film 200 having a convex sectional shape as shown in FIG. 4B is formed on the first main surface 100a of the support body 100. Meanwhile, FIG. 6B discloses only a main part of FIG. 6A, which differs from the case of FIG. 6A in position to install the phosphor evaporation source 15. That is, in the apparatus 10b shown in FIG. 6B, the inflow direction of a metal vapor from the phosphor evaporation source 15 is oriented to the central area AR1 of the support body 100. Thus, as a result of the phosphor evaporation source 15 being installed as shown in FIG. 6B as well, a radiation converting film 200 having a convex sectional shape as shown in FIG. 4B is obtained.

Figure 7A:
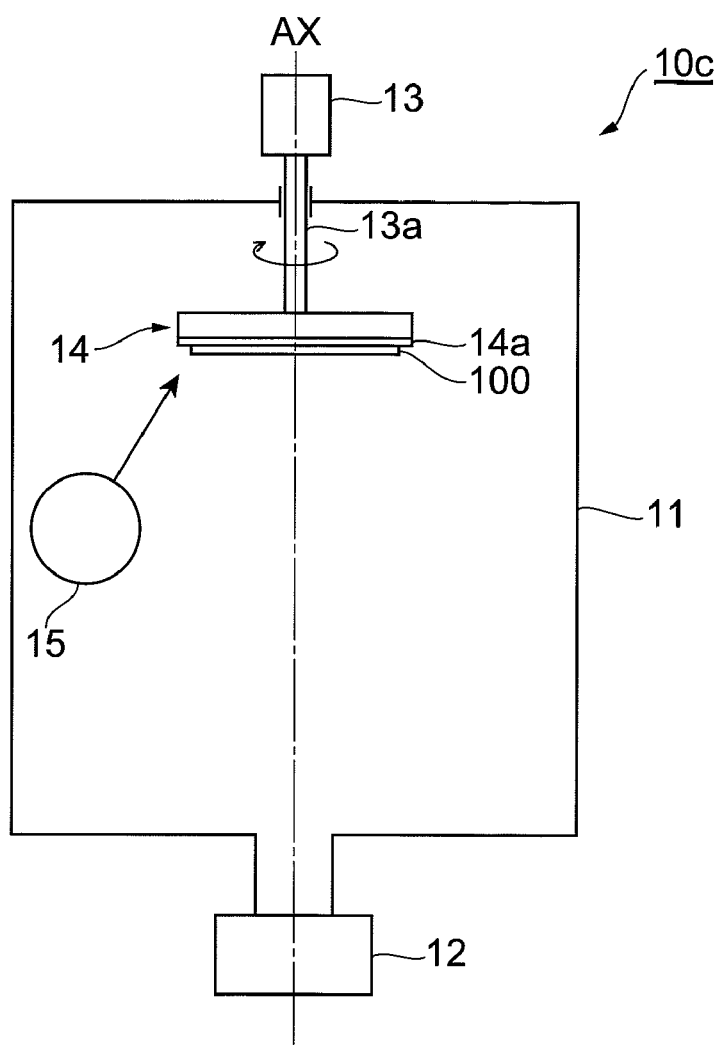
FIGS. 7A and 7B are views showing a configuration of a manufacturing apparatus for forming, on a support body, a radiation converting film with a film thickness increased from the vicinity of the center toward the periphery, as a part of the manufacturing process of a radiation image converting panel according to the present invention.
Figure 7B:
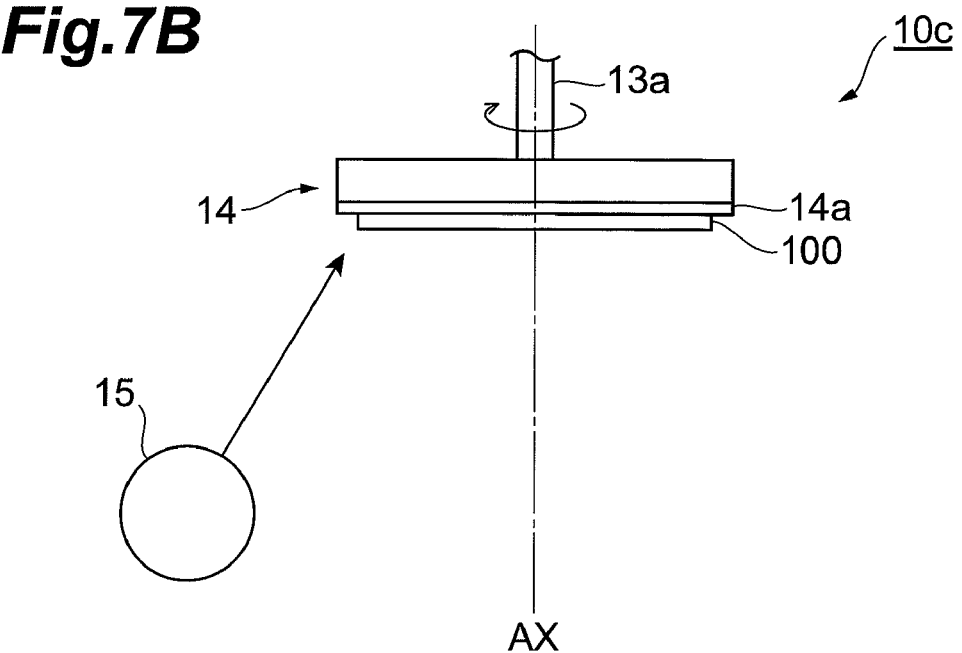

Furthermore, FIGS. 7A and 7B are views showing a configuration of a manufacturing apparatus 10c for forming, on the support body 100, a radiation converting film 200 with a film thickness increased from the vicinity of the center toward the periphery (a concave sectional shape), as a part of the manufacturing process of the radiation image converting panel 1 according to the present invention. The manufacturing apparatus 10c shown in FIGS. 7A and 7B differs from the manufacturing apparatuses 10a and 10b shown in FIGS. 5, 6A, and 6B in terms of arrangement of the phosphor evaporation source 15 and inflow direction of a metal vapor.

More specifically, in the manufacturing apparatus 10c shown in FIG. 7A, the phosphor evaporation source 15 is installed in the vicinity of the support body 100, and the inflow direction of a metal vapor from the phosphor evaporation source 15 is oriented to the peripheral area AR2 of the support body 100 (namely, the edge of the support body 100). As a result of the phosphor evaporation source 15 being thus installed, a radiation converting film 200 having a concave sectional shape as shown in FIG. 4D is formed on the first main surface 100a of the support body 100. Meanwhile, FIG. 7B discloses only a main part of FIG. 7A, which differs from the case of FIG. 7A in position to install the phosphor evaporation source 15. That is, in the apparatus 10c shown in FIG. 7B, the phosphor evaporation source 15 is installed in a manner separated from the support body 100 further than in the case of FIG. 7A, while the inflow direction of a metal vapor therefrom is oriented to the edge of the support body 100 as in the case of FIG. 7A. Thus, as a result of the phosphor evaporation source 15 being installed as shown in FIG. 7B as well, a radiation converting film 200 having a concave sectional shape as shown in FIG. 4D is obtained.

Also, in the case that the radiation converting films 200 having such special sectional shapes as in FIGS. 4C and 4E are formed, it suffices to combine the evaporation source arrangements shown in FIG. 5 and 6A to 7B described above. For example, the radiation converting film 200 having a sectional W-shape shown in FIG. 4C is obtained by combining the arrangement for a sectional convex shape shown in FIG. 6A or 6B and the arrangement for a sectional concave shape shown in FIG. 7A or 7B. In addition, the radiation converting film 200 having a sectional M-shape shown in FIG. 4E is obtained by combining the arrangement for a flat sectional shape shown in FIG. 5 and the arrangement for a sectional convex shape (where the inflow direction of a metal vapor being off the center of the support body 100) shown in FIG. 6A or 6B.

The CsBr being a material of the radiation converting film 200 formed on the support body 100 by any one of the manufacturing apparatuses 10a to 10c of FIGS. 5 and 6A to 7B or combining these as described above is highly hygroscopic. The radiation converting film 200 absorbs vapor in the air to deliquesce when this is kept exposed. Therefore, subsequent to the forming step of the radiation converting film 200 by a vapor deposition method, a moisture-resistant protective film 300 is formed by a CVD method so as to cover an entire exposed surface of the radiation converting film 200. More specifically, the support body 100 on which the radiation converting film 200 has been formed is placed in a CVD apparatus, and a moisture-resistant protective film 300 with a film thickness of approximately 10 μm is formed on the exposed surface of the radiation converting film 200. Thereby, the radiation image converting panel 1 for which the moisture-resistant protective film 300 has been formed on the radiation converting film 200 and the support body 100 is obtained.

Figures 8A, 8B:
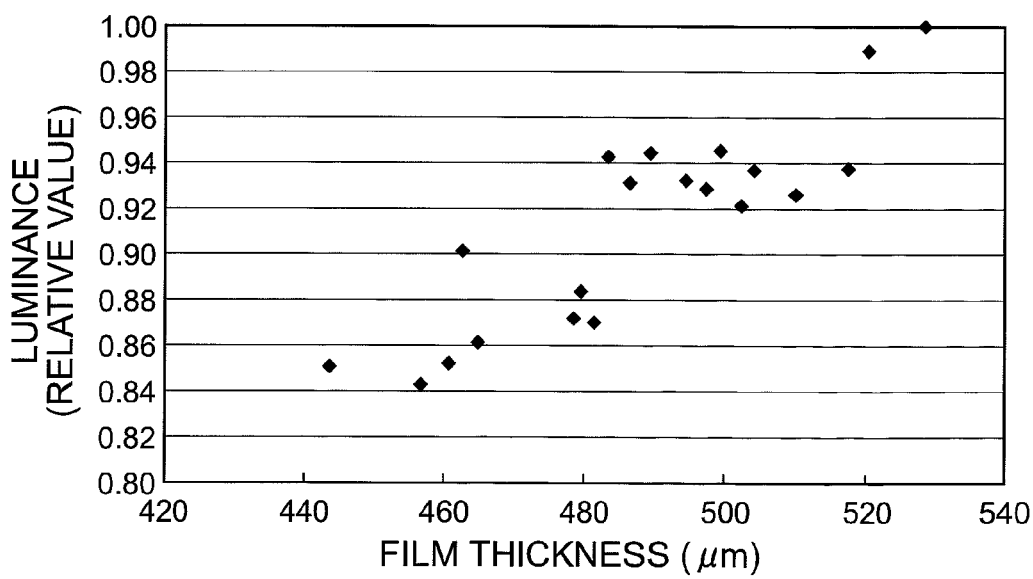
FIGS. 8A and 8B are a table and a graph showing relationships between the film thickness and luminance of radiation converting films.

Next, description will be given of a relationship between film thickness control and a change in luminance of the radiation converting film 200. FIGS. 8A and 8B are a table and a graph showing relationships between the film thickness and luminance of the radiation converting films 200. FIG. 8A is a table showing numerical values when radiation converting film samples having various film thicknesses (μm) were prepared and respective luminances were measured. In FIG. 8A, the luminances are shown as relative values (standardized values with the maximum value provided as 1). FIG. 8B is a graph plotting the relationships between the film thickness and luminance relative value shown in FIG. 8A.

As can be understood from FIG. 8B, the radiation converting films generally have a tendency that as the film thickness increases, the luminance also increases. It can be understood from this that individually adjusting the film thicknesses of arbitrary regions of the radiation converting film 200, the luminance distribution of the panel surface can be adjusted according to usage conditions. In the following, referring to FIGS. 9A to 10B, effects of luminance distribution control by the present invention will be concretely described.

Figure 9A:
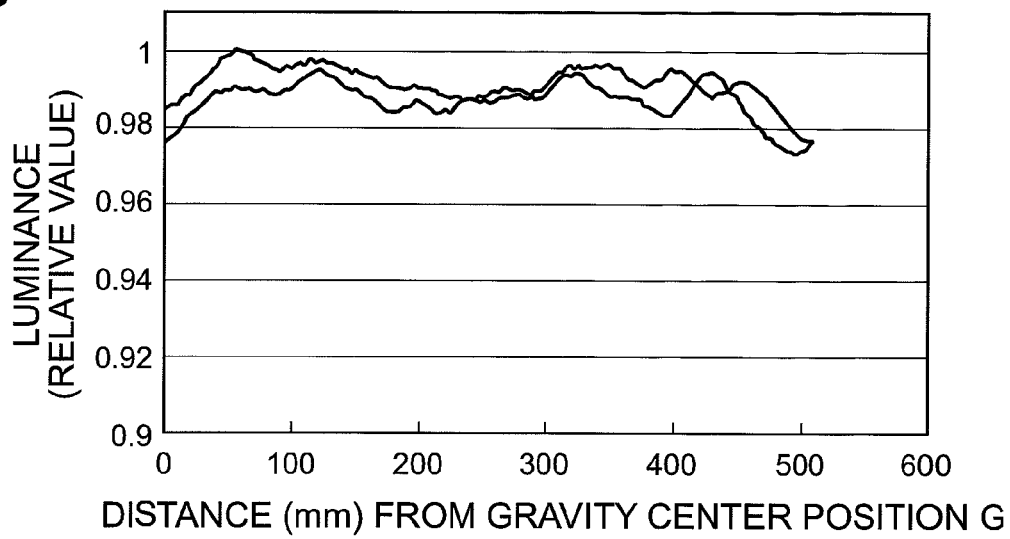
FIGS. 9A and 9B are graphs showing relationships between the distance from the gravity center position and the luminance, with regard to radiation converting films according to comparative examples before and after formation of protective films.
Figure 9B:
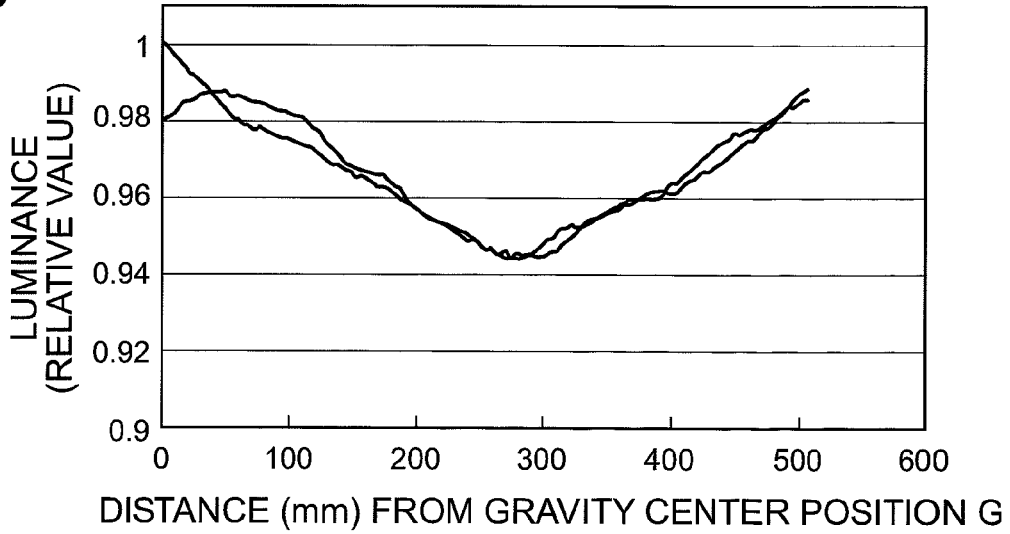

FIGS. 9A and 9B are graphs showing relationships between the distance from the gravity center position and the luminance, with regard to radiation converting films according to comparative examples before and after formation of protective films. Two samples of radiation converting films prepared as the comparative examples have flat sectional shapes. FIG. 9A is a graph showing a relationship between the measuring position (displayed as the distance from the gravity center position) and the relative luminance value, with regard to two prepared samples according to the comparative examples before formation of protective films. Also, FIG. 9B is a graph showing a relationship between the measuring position and the relative luminance value, with regard to two prepared samples according to the comparative examples after formation of protective films. These two samples according to the comparative examples had, before formation of protective films, a ratio of the amount of variation (maximum luminance value minus minimum luminance value) with reference to the maximum luminance value of 2.7%. However, after formation of protective films, for the two samples according to the comparative examples, the ratio of the amount of variation (maximum luminance value minus minimum luminance value) with reference to the maximum luminance value has increased to 5.6%. In particular, as can be understood from FIG. 9B, a drop in luminance in the vicinity of the center of the panel was significant.

Figure 10A:
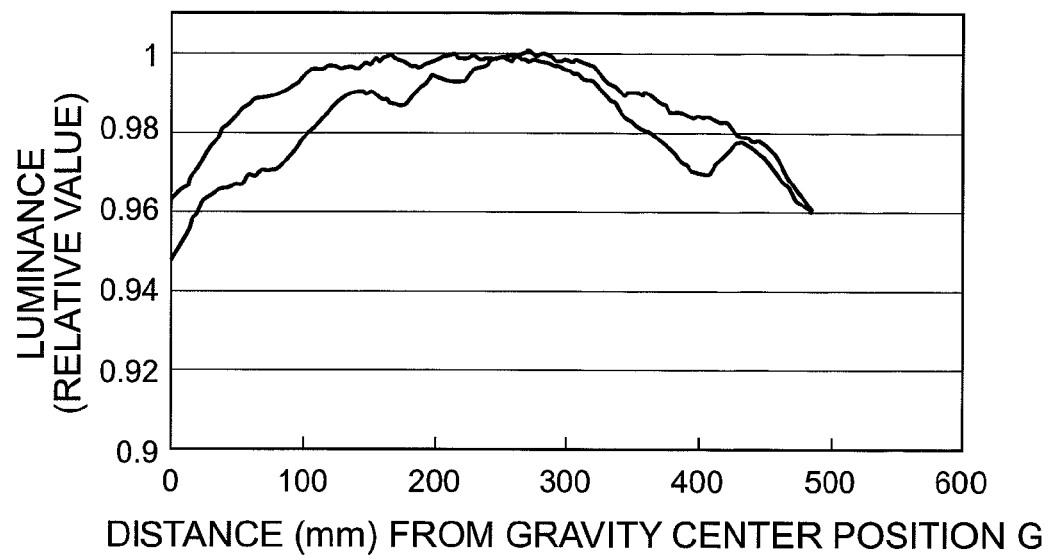
FIGS. 10A and 10B are graphs showing relationships between the distance from the gravity center position and the luminance value, with regard to samples of radiation converting films (each forming a part of a radiation image converting panel according to the present invention) before and after formation of protective films.
Figure 10B:
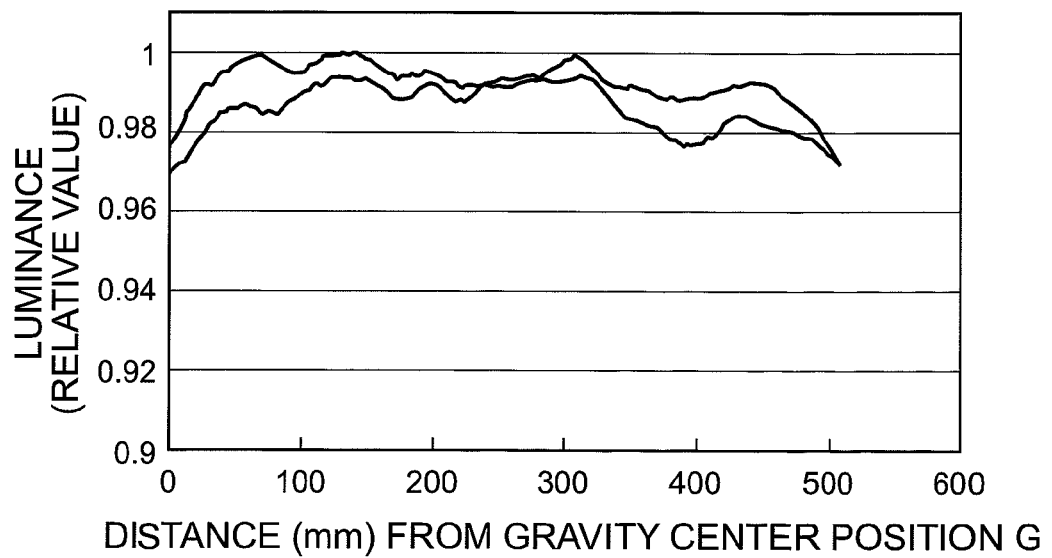

In contrast thereto, FIGS. 10A and 10B are graphs showing relationships between the distance from the gravity center position and the luminance value, with regard to radiation converting films (each forming a part of a radiation image converting panel according to the present invention) before and after formation of protective films. Two samples of the radiation converting films 200 to be applied to the radiation image converting panels 1 according to the present invention have convex sectional shapes. FIG. 10A is a graph showing a relationship between the measuring position (displayed as the distance from the gravity center position) and relative luminance value, with regard to two prepared samples before formation of protective films. Also, FIG. 10B is a graph showing a relationship between the measuring position and the relative luminance value, with regard to two samples after formation of protective films. These two samples had, before formation of protective films, a large ratio of the amount of variation (maximum luminance value minus minimum luminance value) with reference to the maximum luminance value, that is, 6.0%. However, for the two samples after formation of protective films, the ratio of the amount of variation (maximum luminance value minus minimum luminance value) with reference to the maximum luminance value has reduced to 3.2%. In particular, as can be understood from FIG. 10B, as a result of the radiation ray converting films having convex sectional shapes being applied, the luminance of the panel surfaces after formation of protective films is further improved in uniformity.

As in the above, according to the present invention, it becomes possible, in consideration of a change in luminance distribution of the panel surface between before and after formation of a protective film to be provided on the surface of a radiation converting film, to arbitrarily control the luminance distribution of the panel surface after formation of a protective film according to usage conditions, such as making the luminance of the panel surface as a whole uniform, or increasing luminance in only a specific attention region.

From the invention thus described, it will be obvious that the embodiments of the invention may be varied in many ways. Such variations are not to be regarded as a departure from the scope of the invention, and all such modifications as would be obvious to one skilled in the art are intended for inclusion within the scope of the following claims.

What is claimed is:

1. A radiation image converting panel comprising:
   a support body having a first main surface and a second main surface opposing said first main surface; and
   a radiation converting film provided on a film forming region which exists within said first main surface of said support body and includes at least a gravity center position of said first main surface, said radiation converting film being comprised of columnar crystals which are coindicent or tilted at a predetermined angle with respect to a normal direction of said first main surface, wherein, in the film forming region of said first main surface, a part of said radiation converting film having a maximum film thickness locates on a central area around the gravity center position whose radius equals 5% or less of a minimum distance from the gravity center position to an edge of said film forming region, and a part of said radiation converting film having a minimum film thickness locates on a middle area sandwiched by a circumference of a circle whose radius equals 80% of the minimum distance and a contour of the central area.

2. A radiation image converting panel according to claim 1, wherein the film thickness of said radiation converting film located on a peripheral area, which is sandwiched by the circumference of the circle defining the middle area and the edge of the film forming region, monotonically increases from the circumference of the circle defining the middle area toward the edge of said film forming region.

3. A radiation image converting panel according to claim 1, further comprising a protective film that covers an exposed surface of said radiation converting film excluding a surface covered by said first main surface of said support body.

4. A radiation image converting panel comprising:
a support body having a first main surface and a second main surface opposing said first main surface; and
a radiation converting film provided on a film forming region which exists within said first main surface of said support body and includes at least a gravity center position of said first main surface, said radiation converting film being comprised of columnar crystals which are coincident or tilted at a predetermined angle with respect to a normal direction of said first main surface,
wherein, in the film forming region of said first main surface, a part of said radiation converting film having a minimum film thickness locates on a central area around the gravity center position whose radius equals 5% or less of a minimum distance from the gravity center position to an edge of said film forming region, and a part of said radiation converting film having a maximum film thickness locates on a peripheral area sandwiched by a circumference of a circle whose radius equals 80% of the minimum distance and the edge of said film forming region.

5. A radiation image converting panel according to claim 4, wherein the film thickness of said radiation converting film monotonically increases from a minimum film thickness point, which is located on the central area and corresponds to a position where the film thickness of said radiation converting film is minimized, toward a maximum film thickness point, which is located on the peripheral area and corresponds to a position where the film thickness of said radiation converting film is maximized.

6. A radiation image converting panel according to claim 5, wherein, when assuming the minimum film thickness point as an origin, a distance (>0) from the minimum film thickness point as a horizontal axis, and a film thickness (>0) of said radiation converting film at a position corresponding to the distance from the minimum film thickness point as a longitudinal axis, a linear line connecting the point that indicates the minimum film thickness and the point that provides the maximum film thickness has a gradient of more than 0 and less than 0.002.

7. A radiation image converting panel according to claim 4, further comprising a protective film that covers an exposed surface of said radiation converting film excluding a surface covered by said first main surface of said support body.

8. A radiation image converting panel comprising:
a support body having a first main surface and a second main surface opposing said first main surface; and
a radiation converting film provided on a film forming region which exists within said first main surface of said support body and includes at least a gravity center position of said first main surface, said radiation converting film being comprised of columnar crystals which are coincident or tilted at a predetermined angle with respect to a normal direction of said first main surface,
wherein, in said film forming region of said first main surface, a part of said radiation converting film having a minimum film thickness locates on a central area around the gravity center position whose radius equals 5% or less of a minimum distance from the gravity center position to an edge of said film forming region, and a part of said radiation converting film having a maximum film thickness locates on a middle area sandwiched by a circumference of a circle whose radius equals 80% of the minimum distance and a contour of the central area.

9. A radiation image converting panel according to claim 8, wherein the film thickness of said radiation converting film located on a peripheral area, which is sandwiched by the circumference of the circle that defines the middle area and the edge of said film forming region, monotonically decreases from the circumference of the circle that defines the middle area toward the edge of said film forming region.

10. A radiation image converting panel according to claim 8, further comprising a protective film that covers an exposed surface of said radiation converting film excluding a surface covered by said first main surface of said support body.

* * * * *